(12) United States Patent
Cho

(10) Patent No.: US 9,683,528 B2
(45) Date of Patent: Jun. 20, 2017

(54) APPARATUS FOR COOLING VEHICLE INTAKE AIR TEMPERATURE AND METHOD USING THE SAME

(71) Applicant: Hyundai Motor Company, Seoul (KR)

(72) Inventor: Yoon Geun Cho, Daegu (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/948,037

(22) Filed: Nov. 20, 2015

(65) Prior Publication Data

US 2017/0009715 A1 Jan. 12, 2017

(30) Foreign Application Priority Data

Jul. 10, 2015 (KR) .................. 10-2015-0098312

(51) Int. Cl.
*F01N 3/00* (2006.01)
*F02M 35/10* (2006.01)
*F01N 3/20* (2006.01)
*F01N 3/10* (2006.01)
*F01N 3/22* (2006.01)

(52) U.S. Cl.
CPC ......... *F02M 35/10268* (2013.01); *F01N 3/10* (2013.01); *F01N 3/2006* (2013.01); *F01N 3/22* (2013.01); *F02M 35/10124* (2013.01); *F02M 35/10209* (2013.01); *F02M 35/10255* (2013.01); *F01N 2260/04* (2013.01)

(58) Field of Classification Search
USPC ......... 60/278, 279, 280, 287, 289, 290, 291, 60/292, 293, 29, 599, 605.1, 605.25, 295, 60/299; 123/26, 251, 262, 263, 306, 327
See application file for complete search history.

(56) References Cited

U.S. PATENT DOCUMENTS

| | | | | |
|---|---|---|---|---|
| 4,426,967 A | * | 1/1984 | McWhorter | ............ F02B 33/44 123/315 |
| 5,102,431 A | * | 4/1992 | Barry | ............ F01N 3/037 55/337 |
| 7,316,157 B2 | * | 1/2008 | Ohsaki | ............ F01N 11/002 73/114.69 |
| 2008/0133110 A1 | * | 6/2008 | Vetrovec | ............ F02B 29/0412 701/103 |
| 2011/0011084 A1 | * | 1/2011 | Yanagida | ............ F02M 35/084 60/605.2 |

(Continued)

FOREIGN PATENT DOCUMENTS

KR 10-1071873 B1 10/2011

*Primary Examiner* — Binh Q Tran
(74) *Attorney, Agent, or Firm* — Morgan Lewis & Bockius LLP

(57) ABSTRACT

An apparatus for cooling intake air temperature of a vehicle may include a vortex tube receiving high pressure air discharged from an intercooler of a vehicle and then separating the high pressure air using centrifugation into high temperature air and low temperature air; a first bypass line connecting the vortex tube with a compressor, allowing the low temperature air to move therethrough, and selectively opened/closed by a first check valve; a second bypass line connecting the vortex tube with an exhaust line of the vehicle and allowing the high temperature air to move therethrough as a second check valve is opened/closed; and a controller controlling to open or close the first and second check valves.

3 Claims, 5 Drawing Sheets

(56) References Cited

U.S. PATENT DOCUMENTS

| 2011/0030372 A1* | 2/2011 | Ooshima | F02B 33/44 |
| | | | 60/605.2 |
| 2012/0125300 A1* | 5/2012 | Caldwell | F02M 35/10222 |
| | | | 123/568.12 |

* cited by examiner

APPARATUS FOR COOLING VEHICLE INTAKE AIR TEMPERATURE AND METHOD USING THE SAME

CROSS-REFERENCE TO RELATED APPLICATION

The present application claims priority to and the benefit of Korean Patent Application No. 10-2015-0098312 filed on Jul. 10, 2015, the entire contents of which is incorporated herein for all purposes by this reference.

BACKGROUND OF THE INVENTION

Field of the Invention

The present invention relates to an apparatus for cooling intake air temperature of a vehicle engine, and a method using the same.

Description of Related Art

Driving performance and fuel efficiency of a vehicle engine is generally influenced by temperature of air supplied to the engine.

That is, as intake air temperature reaches room temperature, density of air increases and therefore a throttle opening angle decreases. Accordingly, an amount of intake air decreases and fuel usage is reduced, resulting in improved fuel efficiency. In addition, under a full-load condition of the vehicle, torque can be improved since an amount of intake air increases as density of air increases.

As such, in order to decrease the intake air temperature, an inlet opening of an intake system should be opened to the atmosphere while having a large area and being straightly formed.

However, an increase in the area of the inlet opening causes radiated sound to deteriorate, and has an adverse effect on silencing indoor noise.

Further, when the inlet opening of the intake system occupies a large area and is straightly formed, foreign materials may be introduced therein, thereby having an adverse effect on driving stability and durability of the engine.

Accordingly, a new structure for improving fuel efficiency and durability of the vehicle without affecting the driving stability and the durability performance of the engine is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for cooling intake air temperature of a vehicle engine and a method using the same that are capable of efficiently cooling intake air temperature of a vehicle engine without affecting driving stability and durability of the engine.

An exemplary embodiment of the present invention provides an apparatus for cooling intake air temperature of a vehicle, including: a vortex tube receiving high pressure air discharged from an intercooler of a vehicle and then separating the high pressure air using centrifugation into high temperature air and low temperature air; a first bypass line connecting the vortex tube with a compressor, allowing the low temperature air to move therethrough, and being selectively opened/closed by a first check valve; a second bypass line connecting the vortex tube with an exhaust line of the vehicle and allowing the high temperature air to move therethrough as a second check valve is opened/closed; and a controller controlling to open or close the first and second check valves.

The controller may control to move the low temperature air of the vortex tube to the compressor by opening the first check valve and to discharge the high temperature air via an exhaust line under a high load condition of a vehicle engine by opening the second check valve, and may control to close both the first check valve and the second check valve under a low load condition of the vehicle engine.

The apparatus may further include a third bypass line that is connected to the second bypass line via a third check valve to be connected to a catalyst provided in an exhaust system of the vehicle.

The controller may control to: move the low temperature air of the vortex tube to the compressor by opening the first check valve and to discharge the high temperature air via the exhaust line by opening the second check valve under a high load condition of a vehicle engine; close both the first check valve and the second check valve under a low load condition of the vehicle engine; and move the low temperature air of the vortex tube to the compressor by opening the first check valve and to allow the high temperature air to flow into the catalyst via the third bypass line by opening the third check valve under a catalyst regeneration condition of the vehicle engine.

An exemplary embodiment of the present invention provides a method for cooling an intake air temperature of a vehicle, including: (a) separating high pressure air discharged from an intercooler of a vehicle via a vortex tube into high temperature air and low temperature air; (b) moving the low temperature air to a compressor via a first bypass line under a high load condition of a vehicle engine; (c) discharging the high temperature air via an exhaust line using a second bypass line under the high load condition of the vehicle engine; and (d) supplying the high pressure air discharged from the intercooler to the engine under a low load condition of the vehicle engine.

The method may further include (e) allowing the low temperature air of the vortex tube to move to the compressor and allowing the high temperature air to flow into a catalyst via a third bypass line branched from the second bypass line under a catalyst regeneration condition of the vehicle engine.

According to the exemplary embodiment of the present invention, the low temperature air separated from the high pressure air discharged from the intercooler can be recirculated to the compressor under the high load condition of the vehicle engine. Accordingly, the intake air temperature of the vehicle engine can be efficiently cooled, thereby improving operating efficiency of the vehicle engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
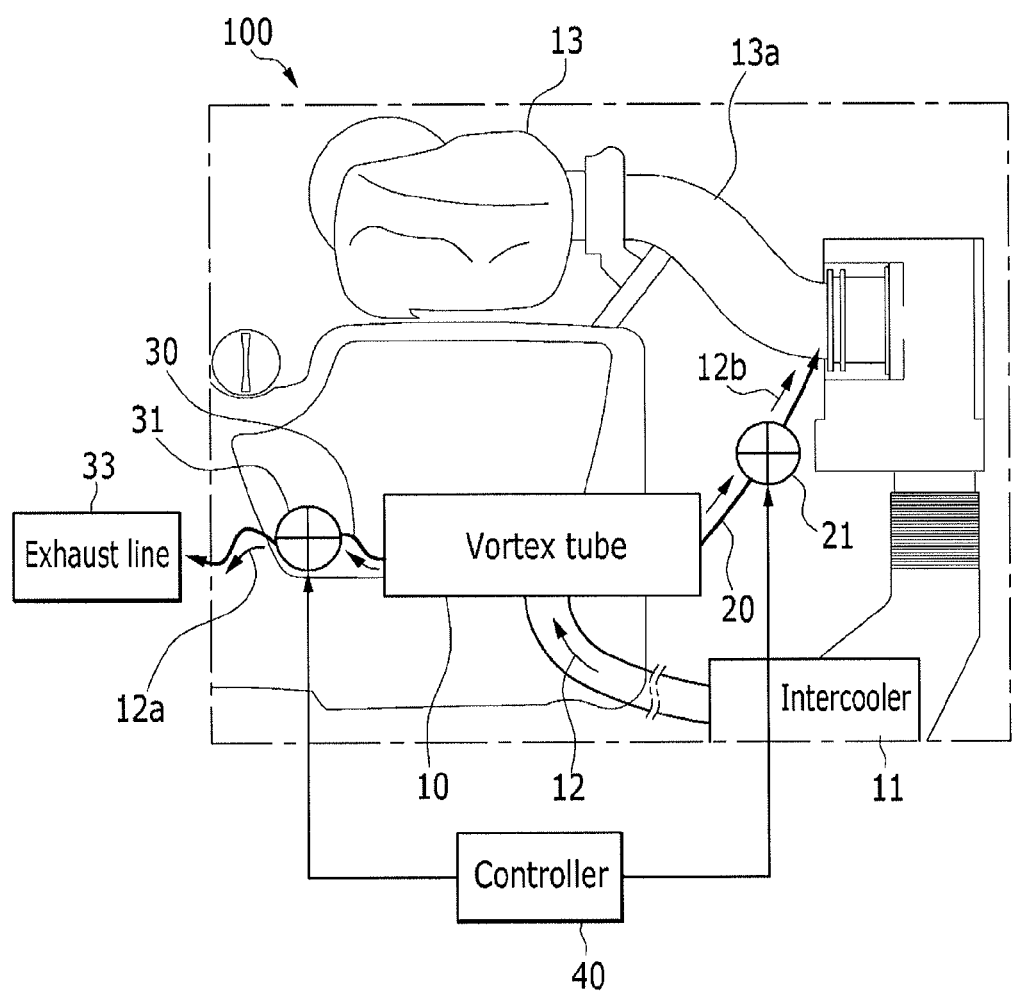
FIG. 1 schematically illustrates main components of an apparatus for cooling intake air temperature of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures FIGS. of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
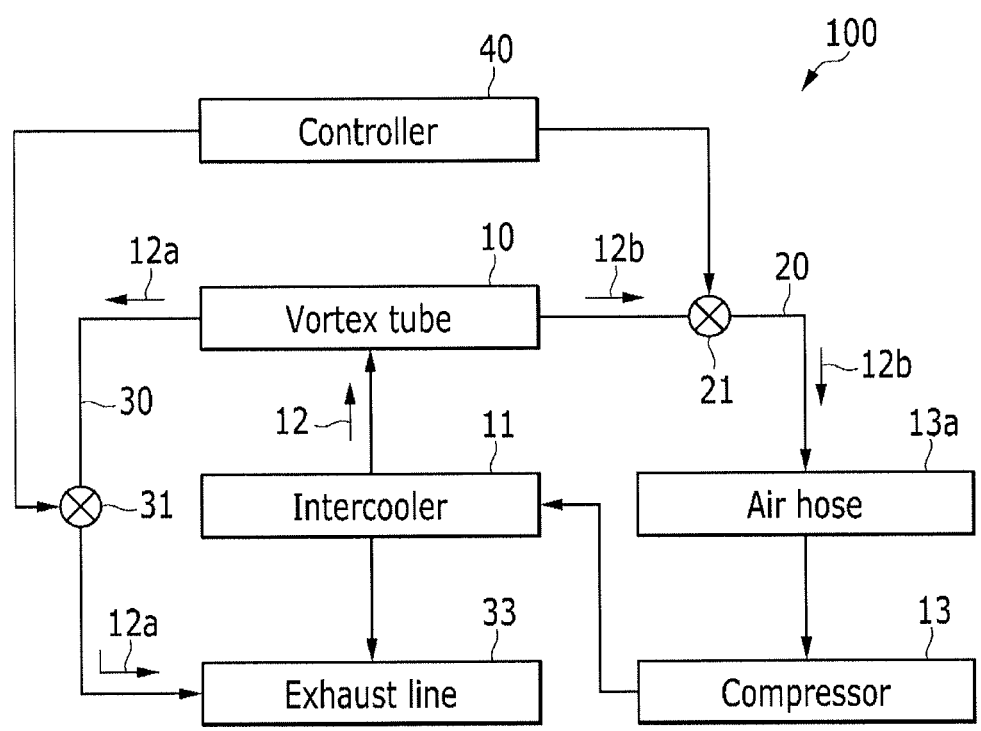
FIG. 2 schematically illustrates a block diagram of an apparatus for cooling intake air temperature of a vehicle according to a first exemplary embodiment of the present invention.

FIG. 1 schematically illustrates main components of an apparatus for cooling intake air temperature of a vehicle according to an exemplary embodiment of the present invention, and FIG. 2 schematically illustrates a block diagram of an apparatus for cooling intake air temperature of a vehicle according to a first exemplary embodiment of the present invention.

As shown in FIGS. 1 and 2, the apparatus 100 for cooling intake air temperature of a vehicle according to the exemplary embodiment of the present invention includes: a vortex tube 10 receiving high pressure air 12 discharged from an intercooler 11 of a vehicle and separating it using centrifugation into high temperature air 12a and low temperature air 12b, a first bypass line 20 connecting the vortex tube 10 with a compressor 13, allowing the low temperature air 12b to move therethrough, and selectively opened/closed by a first check valve 21, a second bypass line 30 connecting the vortex tube 10 and an exhaust line 33 of the vehicle to allow the high temperature air 12a to move therethrough as a second check valve 31 is opened/closed, and a controller 40 controlling to open or close the first and second check valves 21 and 31.

The vortex tube 10 separates the high pressure air into low temperature air and high temperature air by using centrifugal force. The vortex tube 10 may receive the high pressure air discharged from the intercooler 11 of the vehicle and separate it into the low temperature air and the high temperature air. As such, separation into the low temperature air and the high temperature air, which are discharged from the intercooler 11, is performed to cool the intake air temperature of the vehicle. This will be more specifically described below.

Figure 3:
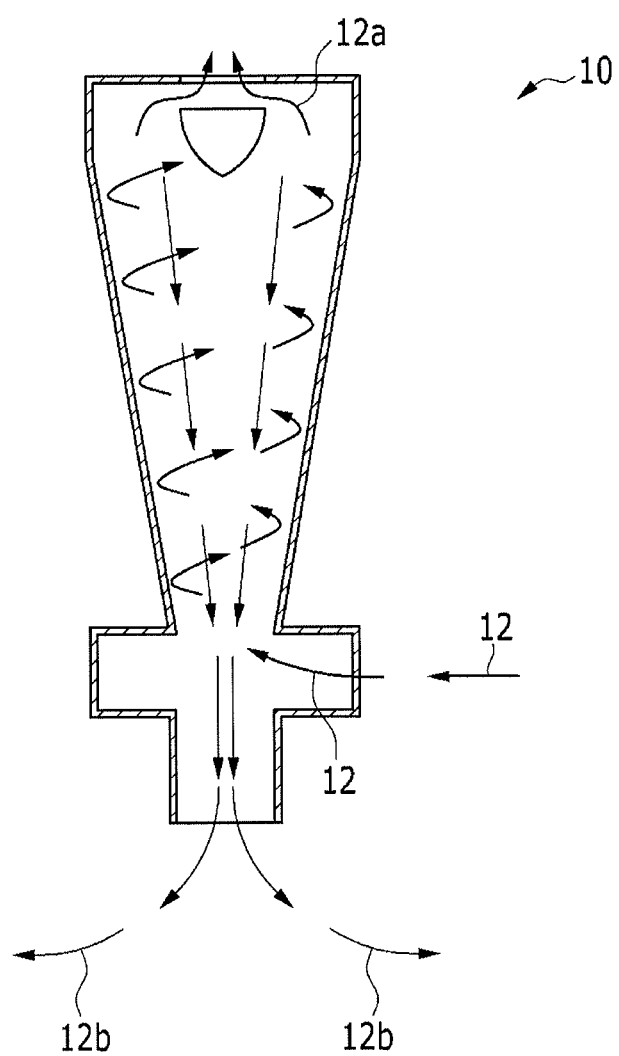
FIG. 3 schematically illustrates a partial cross-sectional view of a vortex tube.

FIG. 3 schematically illustrates a partial cross-sectional view of a vortex tube.

As shown in FIG. 3, the high pressure air 12 supplied via the intercooler 11 is separated into the high temperature air 12a and the low temperature air 12b by the centrifugal force of the vortex tube 10. In this case, the low temperature air 12b may be supplied to the compressor 13 via the first bypass line 20.

One end of the first bypass line 20 may be connected to the vortex tube 10, while the other end thereof may be connected to the compressor 13 via an air hose 13a. The first check valve 21 is provided in the first bypass line 20.

The first check valve 21 is provided to selectively open or close the first bypass line 20, and may be opened/closed by control of the controller 40.

As such, supply of the low temperature air 12b to the compressor 13 via the first bypass line 20 may be performed by the controller 40 that controls to open or close the first check valve 21 under a high load condition of the vehicle. This will be more specifically described when describing the controller 40 below.

The high temperature air 12a separated by the vortex tube 10 may be discharged to the exhaust line 33 via the second bypass line 30. The second check valve 31 is provided in the second bypass line 30.

The second check valve 31 is provided to selectively open or close the second bypass line 30, and may be opened/closed by the control of the controller 40.

As such, discharge of the high temperature air 12a to the exhaust line 33 via the second bypass line 30 may be performed by the control of the controller 40 under the high load condition of the vehicle. This will be more specifically described when describing the controller 40 below.

The controller 40 may control to open or close the first check valve 21 or the second check valve 31 depending on an operating state of the vehicle engine, thereby selectively discharging the low temperature air 12b or the high temperature air 12a to the compressor 13 or the exhaust line 33. The controller 40 refers to an ECU provided in the vehicle, and will be exemplarily described to be provided as an electronic controller in the current exemplary embodiment. A control operation of the controller 40 will be more specifically described below.

First, when the high load condition of the vehicle engine is satisfied, the controller 40 controls to open the first check valve 21 of the first bypass line 20. That is, under the high load condition of the vehicle, internal pressure of the intercooler 11 increases above about 2.7 bar and performance of separation into the high temperature air or the low temperature air via the vortex tube 10 is maximized.

Accordingly, under the high load condition of the vehicle engine, when the controller 40 is used to control to open the first check valve 21, the low temperature air 12b may be moved toward the air hose of the compressor 13 where pressure is relatively lower. Accordingly, the low temperature air 12b may be recirculated toward the compressor 13 such that the intake air temperature is effectively cooled by the low temperature air 12b.

In addition, under the high load condition of the vehicle, the second check valve 31 of the second bypass line 30 of the second check valve 31 may be controlled to be opened. Accordingly, the high temperature air 12a separated by the vortex tube 10 may be discharged to the atmosphere via the exhaust line 33.

On the other hand, when a low load condition of the vehicle engine is satisfied, the controller 40 may control to close both the first check valve 21 and the second check valve 31. Accordingly, air inside the intercooler 11 may not be recirculated, but may be introduced into the vehicle engine.

As described above, the apparatus 100 for cooling intake air temperature of a vehicle according to the first exemplary embodiment of the present invention makes it possible to recirculate the low temperature air separated from the high pressure air discharged from the intercooler 11 toward the compressor under the high load condition of the vehicle engine. Accordingly, the intake air temperature of the vehicle engine can be efficiently cooled, thereby improving operating efficiency of the vehicle engine.

Figure 4:
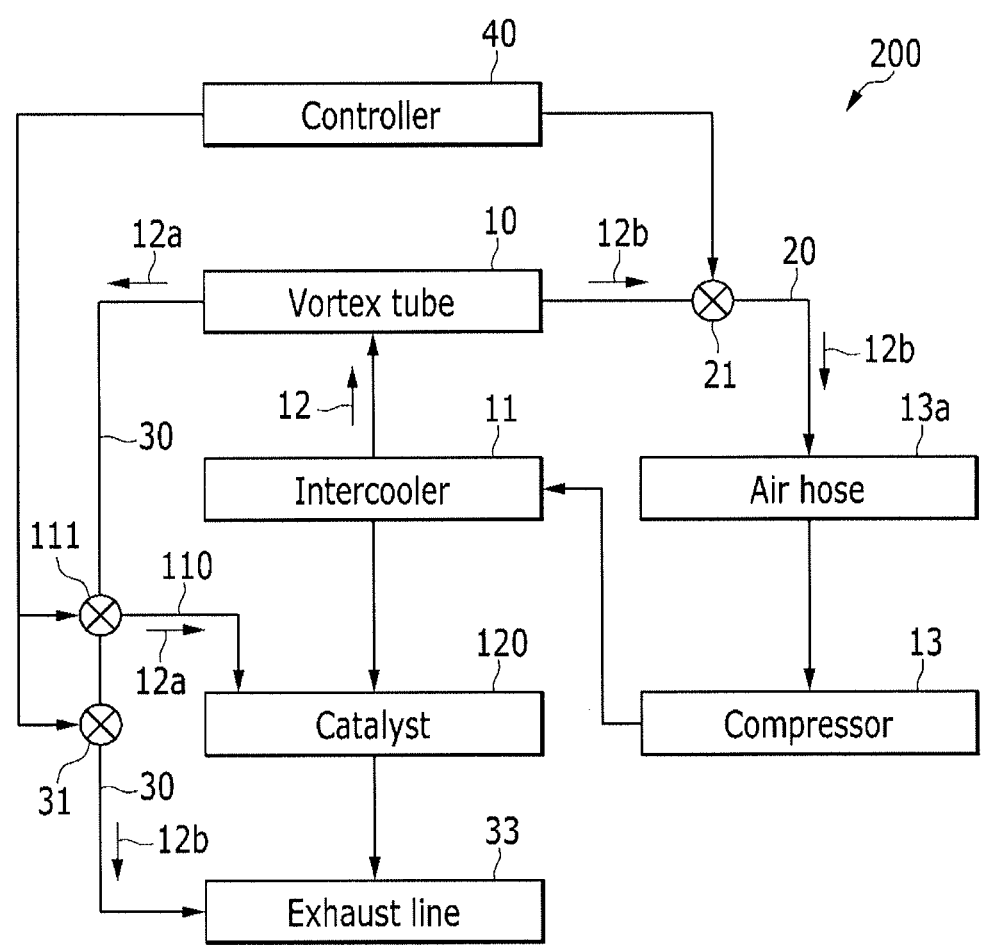
FIG. 4 schematically illustrates a block diagram of an apparatus for cooling intake air temperature of a vehicle according to a second exemplary embodiment of the present invention.

FIG. 4 schematically illustrates a block diagram of an apparatus for cooling intake air temperature of a vehicle according to a second exemplary embodiment of the present invention. The same reference numerals as those in FIGS. 1 to 3 refer to the same or similar members having the same or similar functions. A detailed description of the same reference numerals will be omitted hereinafter.

As shown in FIG. 4, the apparatus 200 for cooling intake air temperature of a vehicle according to the second exemplary embodiment of the present invention includes a second bypass line 30, and a third bypass line 110 that is connected to a catalyst 120 provided in an exhaust system of a vehicle via a third check valve 111.

That is, one end of the third bypass line 110 may be connected to the second bypass line 30 via the third check valve 111, and the other end thereof may be connected to the catalyst 120. The third bypass line 110 may be selectively opened in accordance with opening/closing of the third check valve 111 associated with control of the controller 40.

More specifically, when a high load catalyst regeneration condition of the vehicle engine is satisfied, the controller 40 controls to introduce high temperature air 12*a* into the catalyst 120 by opening the third check valve 111.

Accordingly, under the high load catalyst regeneration condition of the vehicle engine, the high temperature air 12*a* is supplied toward the catalyst 120, and foreign materials such as soot generated in the catalyst 120 can be combusted. Accordingly, under the high load catalyst regeneration condition of the vehicle engine, catalyst efficiency can be improved.

Figure 5:
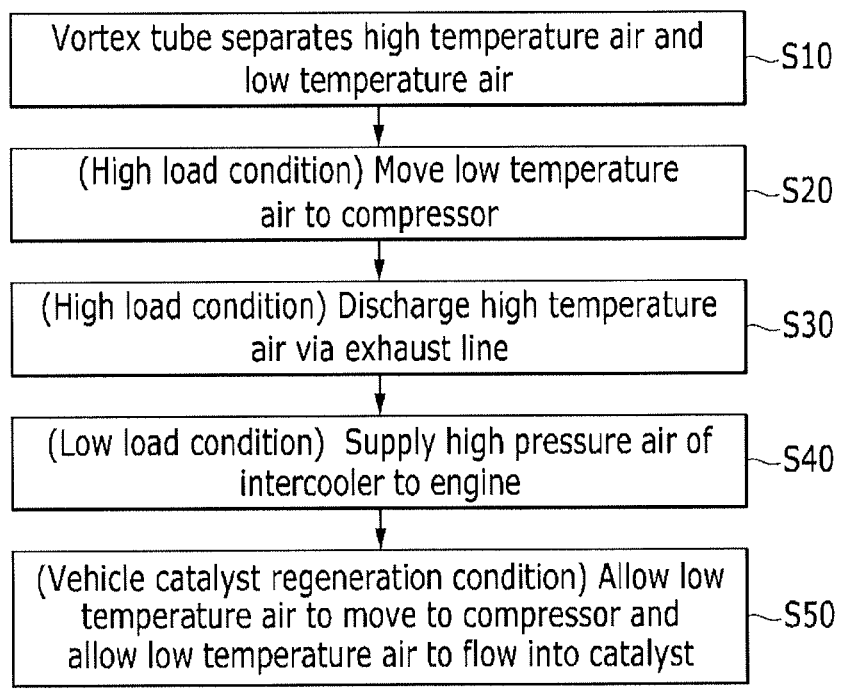
FIG. 5 schematically illustrates a flowchart of a method for cooling intake air temperature of a vehicle according to an exemplary embodiment of the present invention.

FIG. 5 schematically illustrates a flowchart of a method for cooling intake air temperature of a vehicle according to an exemplary embodiment of the present invention. The same reference numerals as those in FIGS. 1 to 4 refer to the same or similar members having the same or similar functions. A detailed description of the same reference numerals will be omitted hereinafter. Hereinafter, a method for cooling intake air temperature of a vehicle will be described in detail with reference to the drawing.

First, high pressure air 12 discharged from an intercooler 11 of a vehicle is separated into high temperature air 12*a* and low temperature air 12*b* via a vortex tube 10 (S10).

Next, under a high load condition of a vehicle engine, the low temperature air 12*b* is moved to the compressor 13 via a first bypass line 20 (S20). In the step S20, a first check valve 21 provided in the first bypass line 20 may be opened by the controller 40 to supply the low temperature air 12*b*. In the step S20, the low temperature air 12*b* may be moved toward an air hose of the compressor 13 where pressure is relatively lower. Accordingly, the low temperature air 12*b* may be recirculated toward the compressor 13 such that intake air temperature is effectively cooled by the low temperature air 12*b*.

Next, under a high load condition of the vehicle engine, the high temperature air 12*a* is discharged from an exhaust line 33 via the second bypass line 30 (S30). In the step S30, a second check valve 31 provided in the second bypass line 30 may be opened by the controller 40 to supply the high temperature air 12*a* to the exhaust line 33, such that the high temperature air 12*a* is discharged to the atmosphere.

Next, under a low load condition of the vehicle engine, the high pressure air 12 discharged from the intercooler 11 is supplied to the engine (S40). In the step S40, the controller 40 controls to close both the first check valve 21 and the second check valve 31. Accordingly, air inside the intercooler 11 may not be recirculated, but may be introduced into the vehicle engine.

Next, in a catalyst regeneration condition of the vehicle engine, the low temperature air 12*b* of the vortex tube 10 is allowed to move to the compressor 13, and the high temperature air 12*a* is allowed to flow into a catalyst 120 via the third bypass line 110 that is branched from the second bypass line 30 (S50). In the step S50, the high temperature air 12*a* may flow into the catalyst 120 via the third bypass line 110 that is connected to the second bypass line 30 via the third check valve 111.

That is, when the third check valve 111 is opened by the control of the controller 40, foreign materials such as soot generated in the catalyst 120 can be combusted by supplying the high temperature air 12*a* to the catalyst 120. Accordingly, under the high load catalyst regeneration condition of the vehicle engine, catalyst efficiency can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for cooling intake air temperature of a vehicle, comprising:
    a vortex tube receiving high pressure air discharged from an intercooler of the vehicle and then separating the high pressure air using centrifugation into high temperature air and low temperature air;
    a first bypass line connecting the vortex tube with a compressor, allowing the low temperature air to move therethrough, and selectively opened or closed by a first check valve;
    a second bypass line connecting the vortex tube with an exhaust line of the vehicle and allowing the high temperature air to move therethrough as a second check valve is opened/closed; and a controller controlling to open or close the first and second check valves, wherein the controller controls to move the low temperature air of the vortex tube to the compressor by opening the first check valve and to discharge the high temperature air via an exhaust line under a high load condition of a vehicle engine by opening the second check valve, and controls to close both the first check valve and the second check valve under a low load condition of the vehicle engine.

2. An apparatus for cooling intake air temperature of a vehicle, comprising:
a vortex tube receiving high pressure air discharged from an intercooler of the vehicle and then separating the high pressure air using centrifugation into high temperature air and low temperature air;
a first bypass line connecting the vortex tube with a compressor, allowing the low temperature air to move therethrough, and selectively opened or closed by a first check valve;
a second bypass line connecting the vortex tube with an exhaust line of the vehicle and allowing the high temperature air to move therethrough as a second check valve is opened/closed; and a controller controlling to open or close the first and second check valves; and
a third bypass line connected to the second bypass line via a third check valve to be connected to a catalyst provided in an exhaust system of the vehicle,
wherein the controller controls
to move the low temperature air of the vortex tube to the compressor by opening the first check valve and to discharge the high temperature air via the exhaust line by opening the second check valve under a high load condition of a vehicle engine;
to close both the first check valve and the second check valve under a low load condition of the vehicle engine; and
to move the low temperature air of the vortex tube to the compressor by opening the first check valve and to allow the high temperature air to flow into the catalyst via the third bypass line by opening the third check valve under a catalyst regeneration condition of the vehicle engine.

3. A method for cooling an intake air temperature of a vehicle comprising:
separating high pressure air discharged from an intercooler of the vehicle via a vortex tube into high temperature air and low temperature air;
moving the low temperature air to a compressor via a first bypass line under a high load condition of a vehicle engine;
discharging the high temperature air via an exhaust line using a second bypass line under the high load condition of the vehicle engine;
supplying the high pressure air discharged from the intercooler to the vehicle engine under a low load condition of the vehicle engine; and
allowing the low temperature air of the vortex tube to move to the compressor and allowing the high temperature air to flow into a catalyst via a third bypass line branched from the second bypass line under a catalyst regeneration condition of the vehicle engine.

* * * * *